June 5, 1923.

L. G. WILLIAMS 1,457,412

PNEUMATIC TIRE FOR VEHICLES

Filed Dec. 11, 1922

INVENTOR
LEWIS G. WILLIAMS,
BY Bright & Bailey
Attys.

Patented June 5, 1923.

1,457,412

UNITED STATES PATENT OFFICE.

LEWIS GARFIELD WILLIAMS, OF CORSYRHELIG, GODRERGRAIG, WALES.

PNEUMATIC TIRE FOR VEHICLES.

Application filed December 11, 1922. Serial No. 606,250.

*To all whom it may concern:*

Be it known that I, LEWIS GARFIELD WILLIAMS, subject of the King of Great Britain, residing at Corsyrhelig, Godrergraig, Glamorganshire, South Wales, have invented new and useful Improvements in and Connected with Pneumatic Tires for Vehicles; and I do hereby declare the following to be a full, clear, and exact description of the invention, such as will enable others skilled in the art to which it appertains to make and use the same.

This invention relates to pneumatic tires for vehicles and it has for its object to provide a tire which will be unpuncturable under normal circumstances, and further which will be capable of carrying a greater load than existing pneumatic tires with increased resiliency.

A pneumatic tire according to the present invention comprises a substantially solid outer cover constituted by a tread portion which forms the junction of three substantially annular integral portions, the central one of such portions being adapted to rest upon the inner tube and the remaining two portions constituting part of the walls of the tire.

According to one embodiment of the invention the outer cover is constructed of fairly deep section and provided circumferentially with an inner continuous air chamber or chambers containing air at atmospheric pressure. The lower edges of this cover may be wired or beaded so as to engage under the circumferential inturned lips or flanges of a metal rim of deep channel section. This rim is of such a section as to provide space for the accommodation of an air tube beneath the outer cover.

By this means the air tube is protected on its outer periphery by means of the substantially solid outer cover and for the remainder of its surface by the enclosing rim. The air tube is thus practically immune from punctures.

In order that my invention may be clearly understood and readily carried into effect I have appended hereto one sheet of drawings illustrating an embodiment of same in which:—

Figure 1:
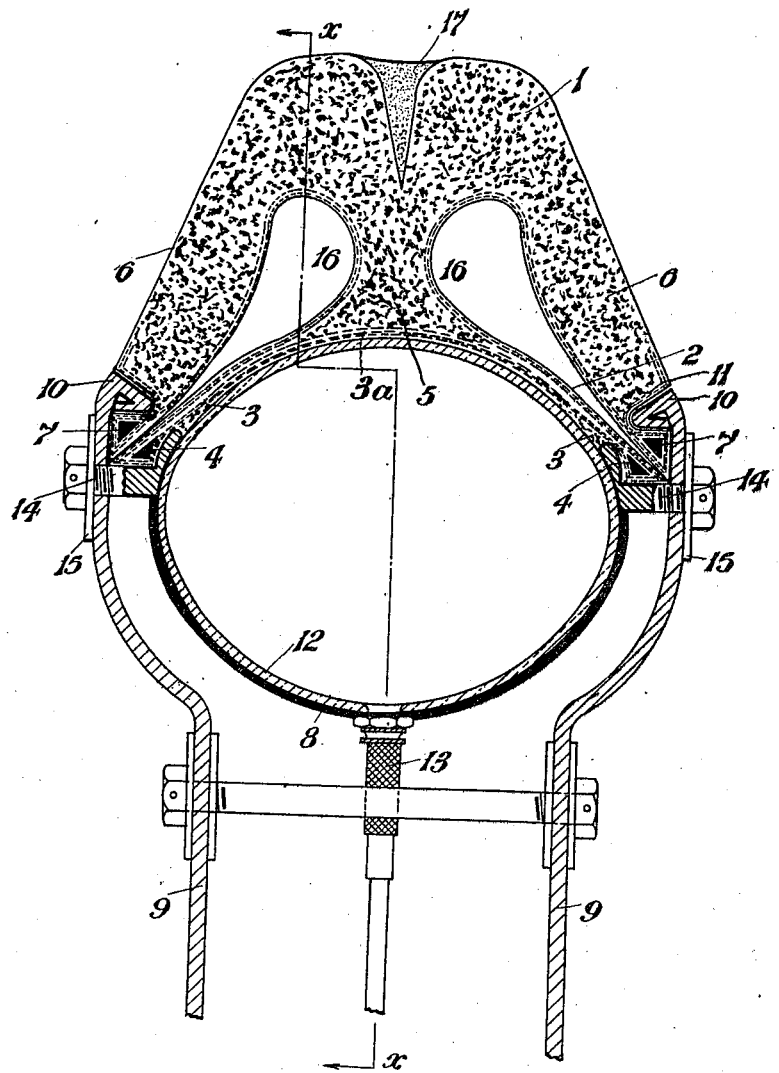
Fig. 1 is a cross sectional view through part of the tire and rim.
Figures 2, 3:
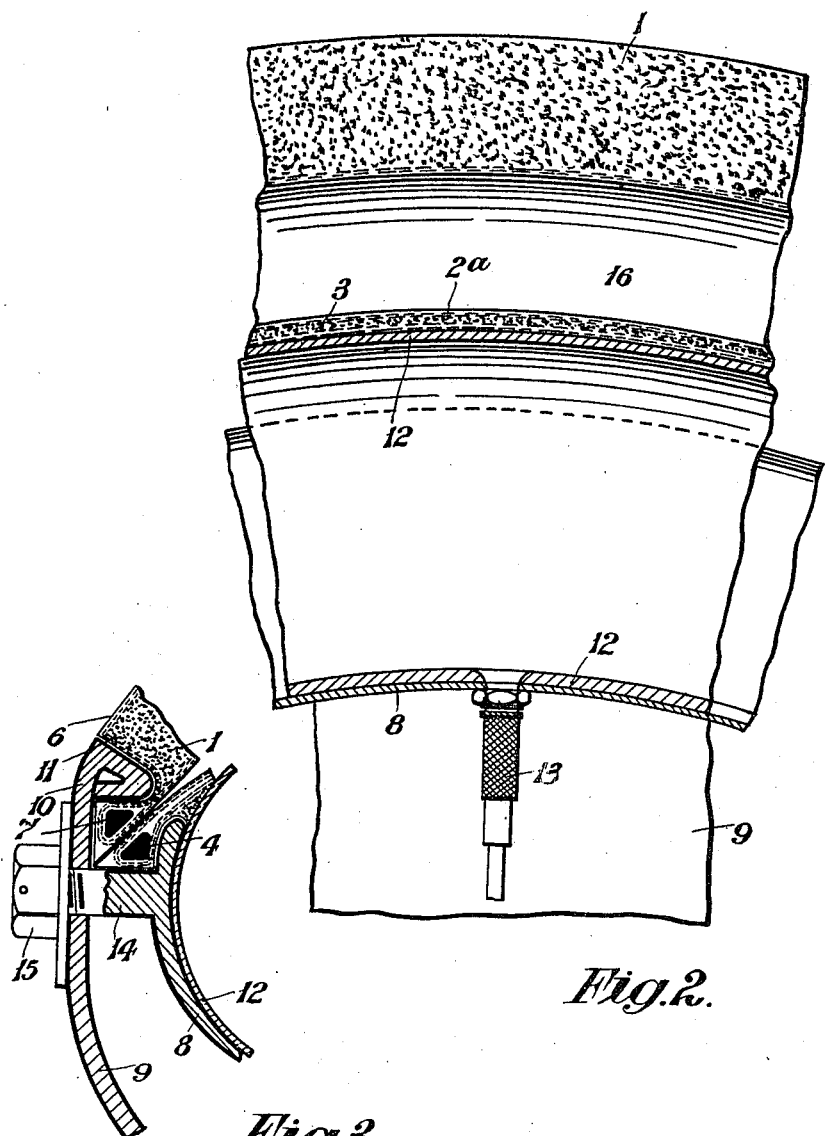
Fig. 2 is a sectional view on the line X—X of Fig. 1.
Fig. 3 is an enlarged view illustrating the securing of the outer cover.

Referring to the drawings the outer cover 1 is preferably substantially of the configuration shown in Fig. 1 in cross section in which its bounding lines represent substantially a truncated isosceles triangle having a concave base and a treading surface or periphery sloping downwardly and outwardly from the centre line. The concave portion 2 which is adapted to reside flush upon the inner tube constitutes a relatively thin pair of balanced annular portions 3 having each at its outer end a circular bead portion 4, and both reinforced by a common connection of rubber impregnated fabric 3ª, each of the annular portions 3 merge into a common thick central portion 5 constituting part of the outer cover. A pair of circumferential air chambers 16 are provided between the annular portions 3 and the relatively thick sides 6 of the tire, such air chambers being somewhat pear shaped in cross section, and closed at their pointed or outer ends by the vulcanization of the bead portions 4 to correspondingly shaped bead portions 7 formed on the sides 6 of the tire.

The two pairs of bead portions 4 and 7 are normally maintained in closed air tight contact by being gripped between the outer surfaces of the peripheries of a rim 8 and a pair of discs 9 each formed on its inner face with a raised peripheral rim 10 for this purpose. The rims 10 which are substantially segmental in cross section are accommodated in correspondingly shaped annular channels 11 constituting the outer ends of the side portions 6 of the tire, which sides are moulded in such a fashion so as to stress inwardly and absorb all exceptional concussions, road shocks or abnormal load.

The rim 8 is concave in cross section and accommodates more than half of an inner tube 12 provided with the customary inflating valve 13 which projects through a hole in the rim 8, and which can be extended to an inflating orifice in either disc 9. The outer extremities of the rim 8 are each formed with a plurality of bolts 14 adapted to support the discs 9, the latter being provided with holes for this purpose. Nuts 15 are threaded on to the bolts 14 so that by tightening the nuts the rims 8 and 10 are brought towards each other whereby the beaded portions 4 and 7 of the tire are gripped together between the specially curved peripheries of the rim 8 and the rims 10.

The circumferential air chambers 16 which are filled with air under atmospheric pressure may conveniently be provided with grooved, corrugated or ribbed walls so as to facilitate distortion under load thereby adding to the resiliency of the tire.

By means of this invention a large resilient area is provided by the substantially oval section of the inner tube for the support of the outer bridge cover. This effect may be further increased by providing the tread of the outer cover with a circumferential V shaped slot 17 or other shaped slot which is filled in with soft or spongy rubber so as to admit of a certain amount of inward lateral movement on the part of the sides of this slot, which movement effects the compression of the soft rubber filling, and permits the periphery to ride solidly on the inner tube below.

The said circumferential slot is preferably of rubber coloured differently than the main tire so as to indicate the need of retreading upon its disappearance or otherwise.

When fitted to a wire wheel the outer ends of the spokes preferably engage side extensions, abutments or lugs on the rim so as to obviate the otherwise necessity of disposing the heads of the spokes within the rim.

It will of course be appreciated that the cross sectional configuration of the outer cover may be modified without departing from the spirit and scope of my invention, for instance it may be continuously curved or only partly curved in cross section.

What I claim is:—

1. A tire for vehicle wheels comprising a tread portion, an annular inwardly directed extension on said tread portion terminating in a concave base of substantially the full width of the tire, a pair of side portions extending laterally and inwardly from said tread portion and contacting at their free ends with the outer face of the free end portions of the base, said extension and said side portions being relatively spaced throughout a major portion of their length to provide air pockets confined entirely within the tire, and beads on the free ends of said side portions whereby said tire may be secured to a wheel.

2. A tire for vehicle wheels comprising a tread portion having side extensions that are adapted to be secured to a wheel and that are deflectable towards one another transversely of the tire, and an annular groove formed centrally in said tread portion to assist deflection of said side portions under the influence of load imposed upon the tire, said groove being filled with soft, pliable material forming a part of said tread portion.

3. The combination with a rim and a pair of disks constituting a wheel, of a tire comprising a tread portion, an annular inwardly directed extension on said tread portion terminating in a concave base of substantially the full width of the tire, a pair of side portions projecting inward from said tread portion in spaced relation to and contacting at their free ends with the free end portions of said base, and means securing related free ends of said side portions and said base together between said rim and said disks.

In witness whereof I have signed this specification in the presence of two witnesses.

LEWIS GARFIELD WILLIAMS.

Witnesses:
G. Hughes,
T. O. Hughes.